(12) United States Patent
Purpura

(10) Patent No.: US 7,016,358 B2
(45) Date of Patent: Mar. 21, 2006

(54) INTERFACE DEVICE WITH NETWORK ISOLATION

(75) Inventor: Don F. Purpura, Yorba Linda, CA (US)

(73) Assignee: Canon Kabushiki Kaisha, Tokyo (JP)

(*) Notice: Subject to any disclaimer, the term of this patent is extended or adjusted under 35 U.S.C. 154(b) by 891 days.

(21) Appl. No.: 09/853,608

(22) Filed: May 14, 2001

(65) Prior Publication Data

US 2002/0169985 A1    Nov. 14, 2002

(51) Int. Cl.
    *H04L 12/56* (2006.01)
(52) U.S. Cl. ...................... 370/401; 370/436
(58) Field of Classification Search ................ 370/419, 370/401, 425, 463, 229, 235, 389, 395.1, 370/396, 398; 713/200–201
See application file for complete search history.

(56) References Cited

U.S. PATENT DOCUMENTS

| | | | |
|---|---|---|---|
| 5,305,385 A * | 4/1994 | Schanning et al. ......... 713/201 |
| 5,432,907 A * | 7/1995 | Picazo et al. ............... 709/249 |
| 5,539,737 A | 7/1996 | Lo et al. ........................ 370/60 |
| 5,680,113 A | 10/1997 | Allen et al. ............. 340/825.05 |
| 5,696,763 A | 12/1997 | Gang, Jr. ..................... 370/390 |
| 5,841,990 A * | 11/1998 | Picazo et al. ............... 709/249 |
| 5,961,597 A | 10/1999 | Sapir et al. ................. 709/224 |
| 5,978,373 A | 11/1999 | Hoff et al. .................. 370/392 |
| 6,006,275 A * | 12/1999 | Picazo et al. ............... 709/249 |
| 6,029,198 A * | 2/2000 | Iizuka .......................... 709/223 |
| 6,079,034 A | 6/2000 | VanZante et al. ............. 714/48 |
| 6,108,311 A * | 8/2000 | Ramaswami et al. ....... 370/258 |
| 6,115,385 A | 9/2000 | Vig ............................. 370/401 |
| 6,172,606 B1 | 1/2001 | Lokyer .................... 340/568.2 |
| 6,414,958 B1 * | 7/2002 | Specht .................. 370/395.53 |
| 6,754,826 B1 * | 6/2004 | Challener et al. ........... 713/182 |

\* cited by examiner

*Primary Examiner*—Dang Ton
*Assistant Examiner*—Phuc Tran
(74) *Attorney, Agent, or Firm*—Fitzpatrick, Cella, Harper & Scinto

(57) ABSTRACT

An interface device for interfacing between a networkable device such as a printer and a network, includes a hub and a circuit board, with the hub constructed with plural ports to repeat network transmissions received on one port to all other ports. An isolation switch is provided for controllably isolating the port to which the network is connected so that network transmissions are not repeated by the hub. The isolation switch is operated under control of the circuit board, which implements network functionality for the networkable device. For example, where the networkable device is a printer, the extended network functionality provided by the circuit board may relate to secure printing. The isolation switch can be operated so as to isolate the network from the printer, to permit the circuit board to transmit decrypted print jobs in clear text to the printer without danger of interception over the network.

6 Claims, 6 Drawing Sheets

INTERFACE DEVICE WITH NETWORK ISOLATION

BACKGROUND OF THE INVENTION

1. Field of the Invention

The present invention relates to an interface device for interfacing between a networkable device and a network, and particularly relates to such an interface device which is controllable to isolate the network from the networkable device.

2. Description of the Related Art

One desirable characteristic of networkable devices is the capability to upgrade the device so as to provide enhanced performance or extended and new functionality. For example, in connection with previously deployed legacy devices such as network printers, it is advantageous to be able to upgrade functionality of the printer so as to provide extended functionality not originally provided with the printer (such as printing of grayscale images) or to provide improvements in performance (such as more efficient print engines).

Conventionally, such upgrades are provided through re-programming of firmware included with the legacy device. Existing techniques allow for reprogramming of the device, and include techniques for reprogramming the network device directly over the network.

Efforts to upgrade, however, are largely constrained by the processing capabilities of the legacy device. That is, there are some upgrades that require more processing power or memory, or require more electronic circuitry, than originally provided with the legacy device. In such circumstances, it is not possible to provide some upgrades on some machines.

In an effort to address this situation, it has been considered to provide extended functionality and upgrades in an interface device interposed between the networkable device and the network. FIGS. 1A and 1B illustrate this situation in connection with a networkable printer. As shown in FIG. 1A, a legacy printer 10 which is connected to network 11 has constraints on processing power and/or electrical circuitry that make it impossible to provide for upgrades. As shown in FIG. 1B, an interface device 12 is interposed between the network 11 and printer 10. The interface device includes the desired upgrades, and functions to intercept network transmissions to and from printer 10, process such transmissions in accordance with the upgraded functionality, and retransmit the transmission to printer 10 but in a format understood by the legacy printer. By virtue of the interface device, it is possible to provide for extended and upgraded functionality on printer 10 even when printer 10 is constrained such that the functionality cannot be provided on the printer itself.

FIG. 2 illustrates interface device 12 in greater detail. As shown in FIG. 2, the interface device 12 includes a hub 14 and a circuit board 15 which includes the extended functionality desired for legacy printer 10. The hub 14 includes plural ports including a first port A to which network 11 is connected, a second port B to which printer 10 is connected, and a third port C to which the circuit board is connected. In accordance with standard functionality of the hub, transmissions received on any one port are repeated to all other ports, as depicted in the double headed arrows of FIG. 2.

One problem arises because of the standard functionality of conventional hubs in that network transmissions received from one port are repeated to all other ports. In particular, there are certain circumstances in which it is undesirable for transmissions intended for printer 10 from circuit board 15 on port C also to be repeated to network 11 on port A. One such circumstance relates to situations where extended functionality provided by board 15 is secure printing functionality. In such a situation, the board receives an encrypted print job from the network, decrypts the print job, and transmits the decrypted print job in "clear text" to printer 10. If such transmissions intended only for printer 10 are also repeated to network 11 at port A, the entire network would receive a "clear text" version of potentially sensitive print jobs that were intended only for printer 10.

SUMMARY OF THE INVENTION

It is therefore an object of the invention to provide an interface device between a networkable device and a network in which the network can be isolated from communication.

According to one aspect, such an interface device includes a hub with plural ports constructed to repeat network transmissions received on one port to all other ports. An isolation switch is provided for one of the ports, the isolation switch being controllably operable to isolate the port from network transmissions repeated by the hub. The isolation switch is controlled by a circuit board connected to the hub, preferably a circuit board which includes extended functionality for the networkable device.

Because the hub includes an isolation switch controllable to isolate the network from network transmissions repeated by the hub, the network does not receive transmissions that it otherwise might. For example, in circumstances where the circuit board provides secure printing functionality for a legacy printer, the circuit board can toggle the isolation switch between a "pass-through" mode in which data sent by the board is repeated to all ports of the hub, and a "bypass" mode in which the network is isolated. While in the "pass-through" mode, if the circuit board detects a secure printing job, then after decrypting the secure print job it toggles the isolation switch to the "bypass mode" and then transmits the decrypted print job in clear text to the printer. Because the network is isolated while in the bypass mode, a private communication can be established between the board and the printer, thereby ensuring that potentially sensitive information is not broadcast to the entire network.

The isolation switch can also be controlled to isolate the network in circumstances where it is simply desired to reduce network traffic on the overall network. Thus, even in circumstances where the board is transmitting non-secure information to the printer, the isolation switch can be toggled to the "bypass" mode simply to reduce network traffic on the network.

In particularly preferred aspects, the circuit board and the networkable device can share a common network address, although each listens on a differently numbered port at the common address. For example, internet protocol (IP) addresses are given in the format xxx.xxx.xxx.xxx:port, where xxx.xxx.xxx.xxx is the IP address and port is the port number. In such a situation, both the circuit board and the networkable device will share a common IP address but will listen for transmissions on a different port number. Based on whether network transmissions are received at a pre-defined port number, the circuit board operates to toggle the isolation switch between pass-through and bypass modes.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1B:
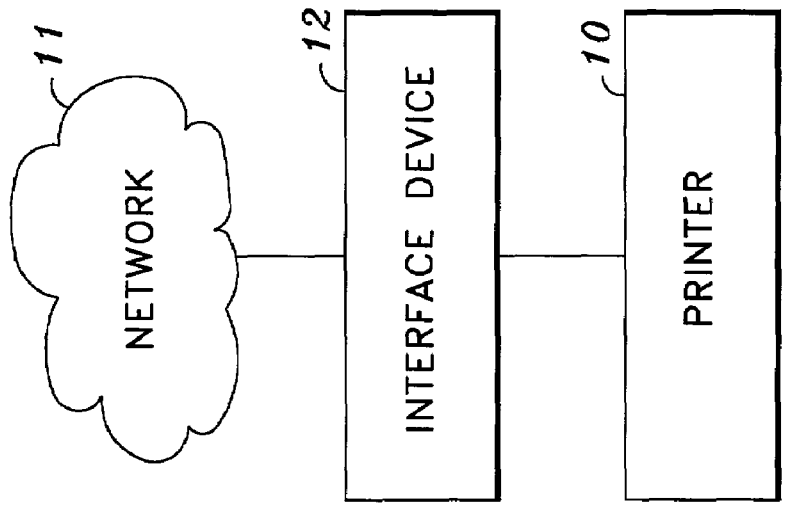
FIGS. 1A and 1B are views for explaining conventional network arrangements.
Figure 1A:
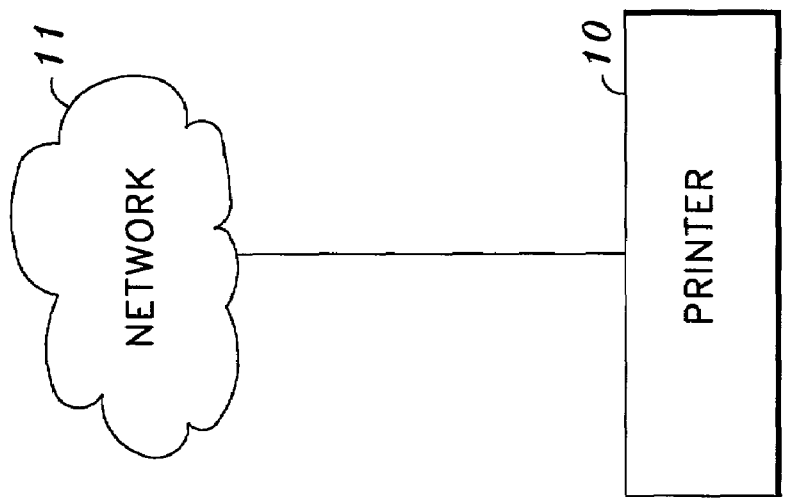
Figure 2:
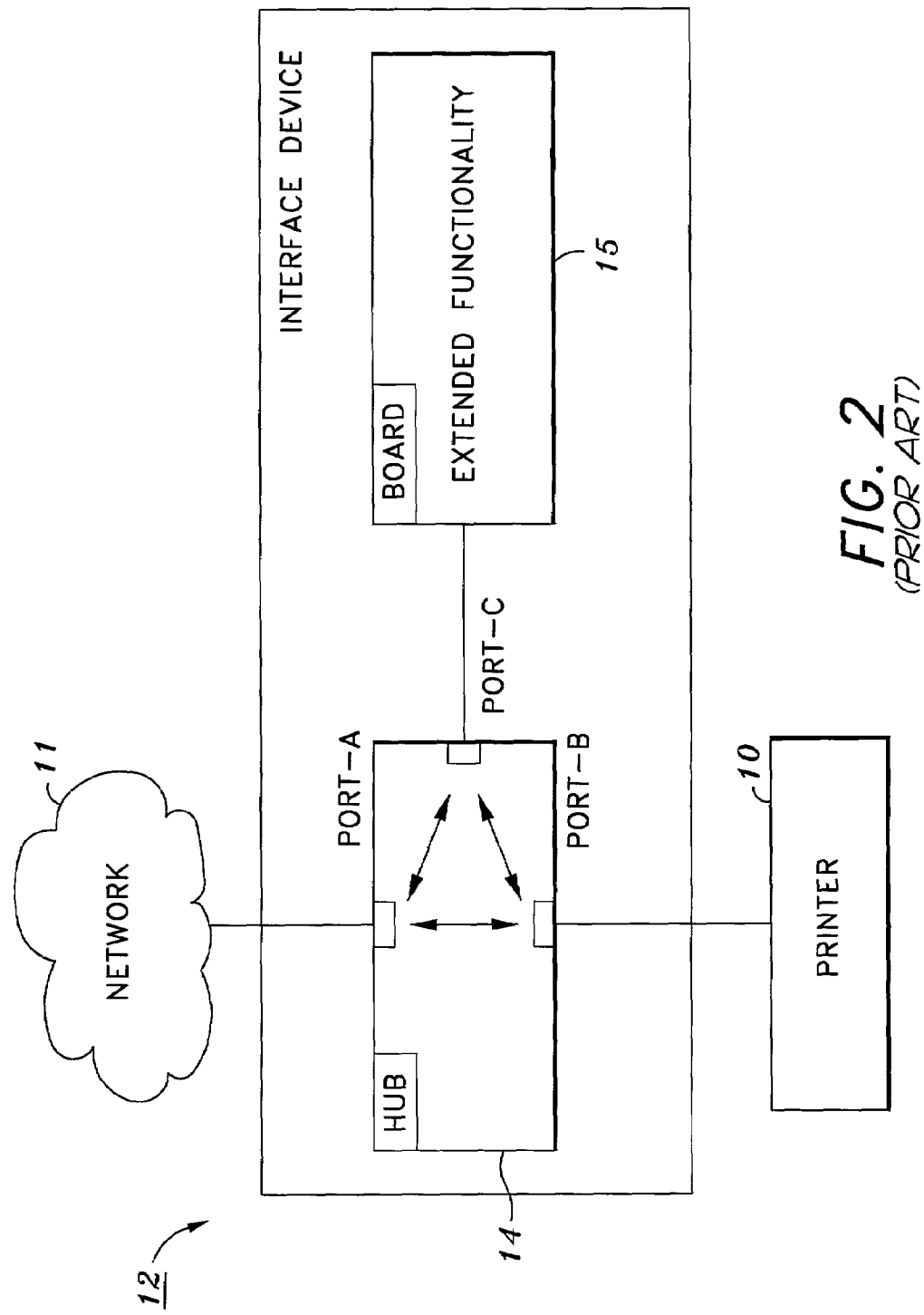
FIG. 2 is a detailed diagram of the interface device shown in FIG. 1B.
Figure 3:
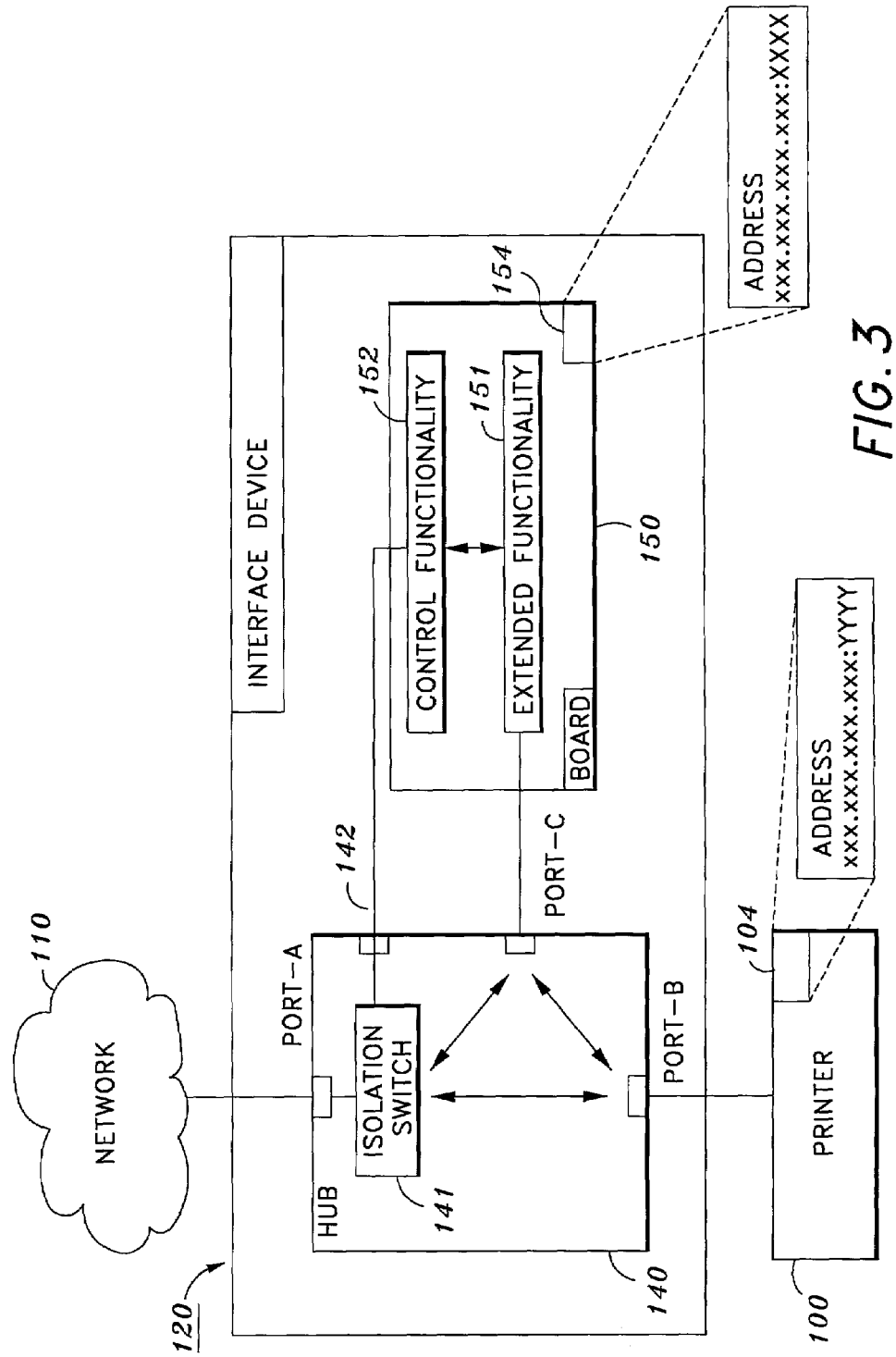
FIG. 3 is a view for explaining a first embodiment of the invention.

FIG. 3 is a detailed view of a first embodiment of the invention, in which an interface device 120 interfaces between network 110 and a networkable device such as printer 100. As shown in FIG. 3, interface device 120 includes a hub section 140 and a circuit board section 150. Hub 140 includes plural ports including a first port A connected to network 110, a second port B connected to printer 100, and a third port C connected to circuit board 150. Hub 140 is constructed so that network transmissions received on any one port are repeated to all other ports, as depicted by the double-headed arrows of FIG. 3. Hub 140 further includes isolation switch 141 which controllably isolates port A from repeated transmissions, under control of a control signal received by hub 140 at interface 142. Isolation switch 141 is preferably realized with an electrical latch.

Circuit board 150 includes electronic circuitry, microprocessors and memory, so as to realize at least two blocks of functionality, namely extended functionality 151 and control functionality 152. Extended functionality 151 relates to extensions of existing functionality on the networkable device. In the present embodiment, since the networkable device is constituted by printer 100, extended functionality 151 pertains to extended functionality for a printer and might include, by way of example, extended functionality for effectuating secure printing. Other examples of extended functionalities include access control to the device, job accounting, remote maintenance, JINI-enablement, internet printing over IPP, and directory enabling.

Control functionality 152 operates in conjunction with extended functionality 151 so as to provide a control signal to operate isolation switch 141.

As shown in FIG. 3, hub 140 and circuit board 150 are housed in a common housing. Other alternatives are possible, however, and it is likewise possible that hub 140 is physically separate or separable from circuit board 150.

Likewise, although interface 142 is shown as a separate interface from port C, it is possible for interface 142 to be physically combined with the electrical terminals in port C. In such a circumstance, the interface is provided through detection, at hub 140, of special-purpose signals transmitted from circuit board 150.

Although 140 is depicted as a hub, alternate constructions are also possible and the word "hub" is considered to encompass all such constructions, for example, a switch operated in broadcast or mirror mode (sometimes called "promiscuous" mode).

In the present embodiment, where extended functionality 151 relates to secure printing for printer 100, circuit board 150 is constructed to listen at the same network address 154 as the network address 104 of printer 100. However, circuit board 150 listens on a differently numbered port from that of printer 100, and specifically listens on port 631 which is commonly designated as the port address for secure print jobs. Until a network transmission on port 631 is received, circuit board 150 takes no action, and control functionality 152 maintains isolation switch 141 in a "pass-through" mode. "Pass-through" mode is a normal configuration for hub 140, in which data received at any one port is repeated to all other ports including port A connected to network 110. Upon receipt of a network transmission on port 631, however, and after recognition of such a network transmission as a secure print job, circuit board 150 implements the extended functionality of block 151 to decrypt the print job and thereafter implements control functionality of block 152 to toggle isolation switch 141 to a "bypass" mode. In "bypass" mode, hub 140 operates so as to repeat transmissions received at a port to all other ports with the exception of port A which is connected to network 110. Consequently, in "bypass" mode, network 110 is isolated from communications on all other ports of hub 140. Then, while isolation switch 141 is maintained in "bypass" mode, extended functionality 151 of circuit board 150 transmits the decrypted print job in clear-text to printer 100 via a transmission to port C which hub 140 repeats to port B.

Although the present embodiment bases its switchover between the "pass-through" and "bypass" modes on receipt of network transmissions at a specific port, other arrangements are also possible. Switchover can be controlled based on the functionality provided by the circuit board 150. For example, where the extended functionality 151 augments existing functionality of printer 101 (such as job accounting), both the printer and board 150 would listen at identical addresses. Switchover between modes is then controlled as appropriate to the extended functionality, such as a switchover to "bypass" mode at the conclusion of receipt of a print job, so as to permit transmission from board 150 to printer 101 of job accounting information while network 110 is isolated.

Figure 4:
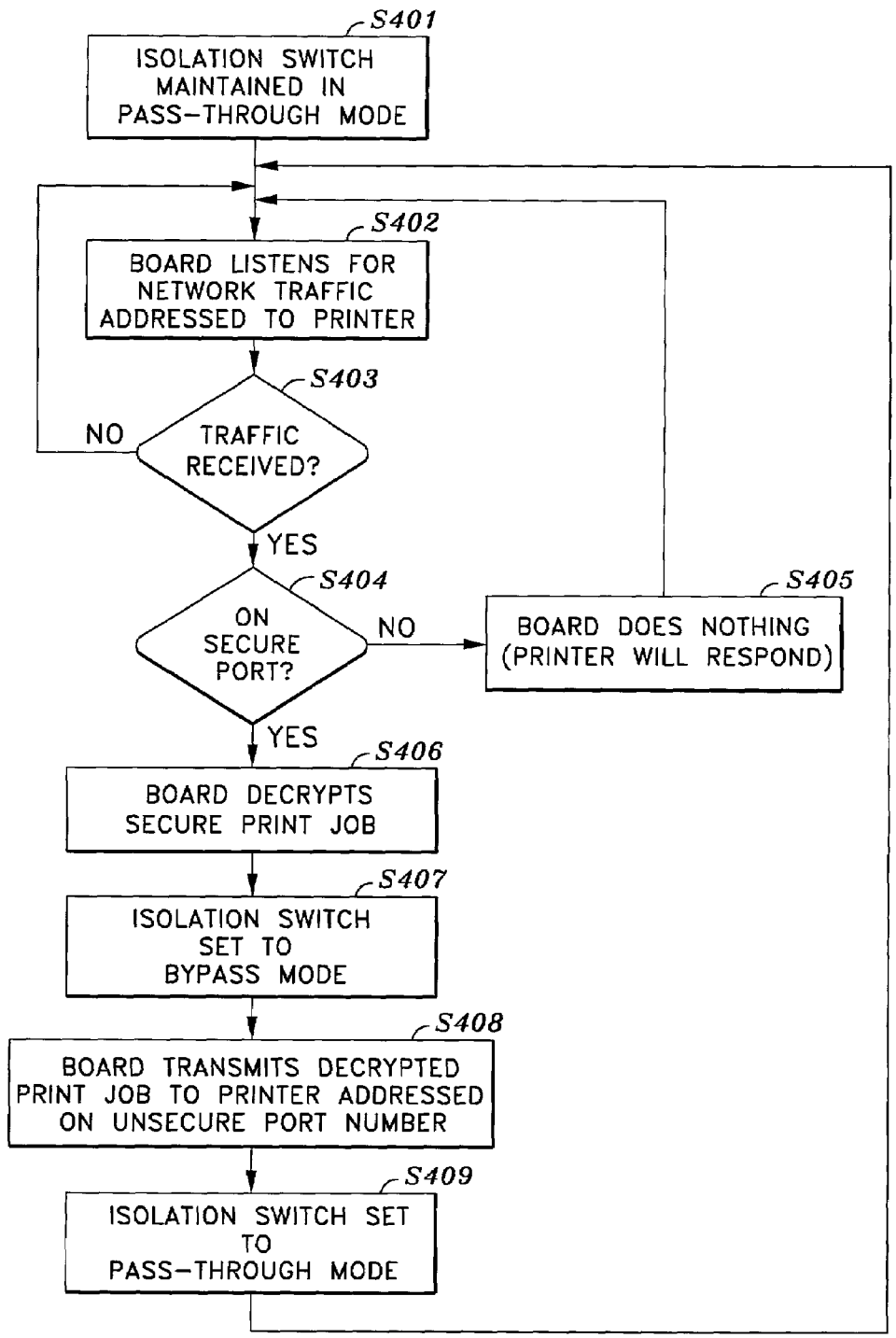
FIG. 4 is a flow diagram for explaining operation of the first embodiment.

FIG. 4 illustrates operation of the FIG. 3 embodiment in more detail. In steps S401 and S402, control functionality 152 has set isolation switch 141 to pass-through mode, and extended functionality 151 listens for network traffic addressed to printer 100. Until traffic addressed to the printer is received, isolation switch 141 is maintained in the pass-through mode, such that network traffic received at any port on hub 140 is repeated to all other ports. When network traffic addressed to printer 100 is received (step S403), circuit board 150 determines whether the network traffic was received on secure port 631 (step S404). If the network traffic was not received on the secure port, then circuit board 150 does nothing and maintains isolation switch 141 in pass-through mode. As indicated at step S405, since the network traffic was addressed to printer 100 on an unsecured port, it is expected that the printer itself will respond.

On the other hand, if network traffic addressed to printer 100 is received on the secure port 631, then circuit board 150 responds as indicated in steps S406 through S409. It is to be noted that printer 100 does not even listen to secure port 631, and thus will not respond to such network traffic, since the functionality for secure printing is not implemented on the printer, but rather is implemented on circuit board 150.

First, as indicated at step S406, circuit board 150 implements the extended functionality at block 151 to decrypt the secure print job. Thereafter, control functionality 152 is exercised so as to generate a control signal that toggles isolation switch 141 into bypass mode. In bypass mode, network 110 is isolated from receiving transmissions received by hub 140 to its ports. While isolation switch 141 is in bypass mode, circuit board 150 transmits the decrypted print job to printer 100 on the unsecure port (step S408). After the decrypted print job has been transmitted to the printer, control functionality 152 is exercised so as to generate a control signal that toggles isolation switch 141 to its pass-through mode. Thereafter, flow returns to step S402 where board 150 listens for network traffic addressed to printer 100.

As mentioned above in connection with FIG. 4, alternative operations can control switchover between the pass-through and bypass modes on criteria that differs from receipt of network transmissions on port 631, such as control based on extended functionality 151.

Figure 5:
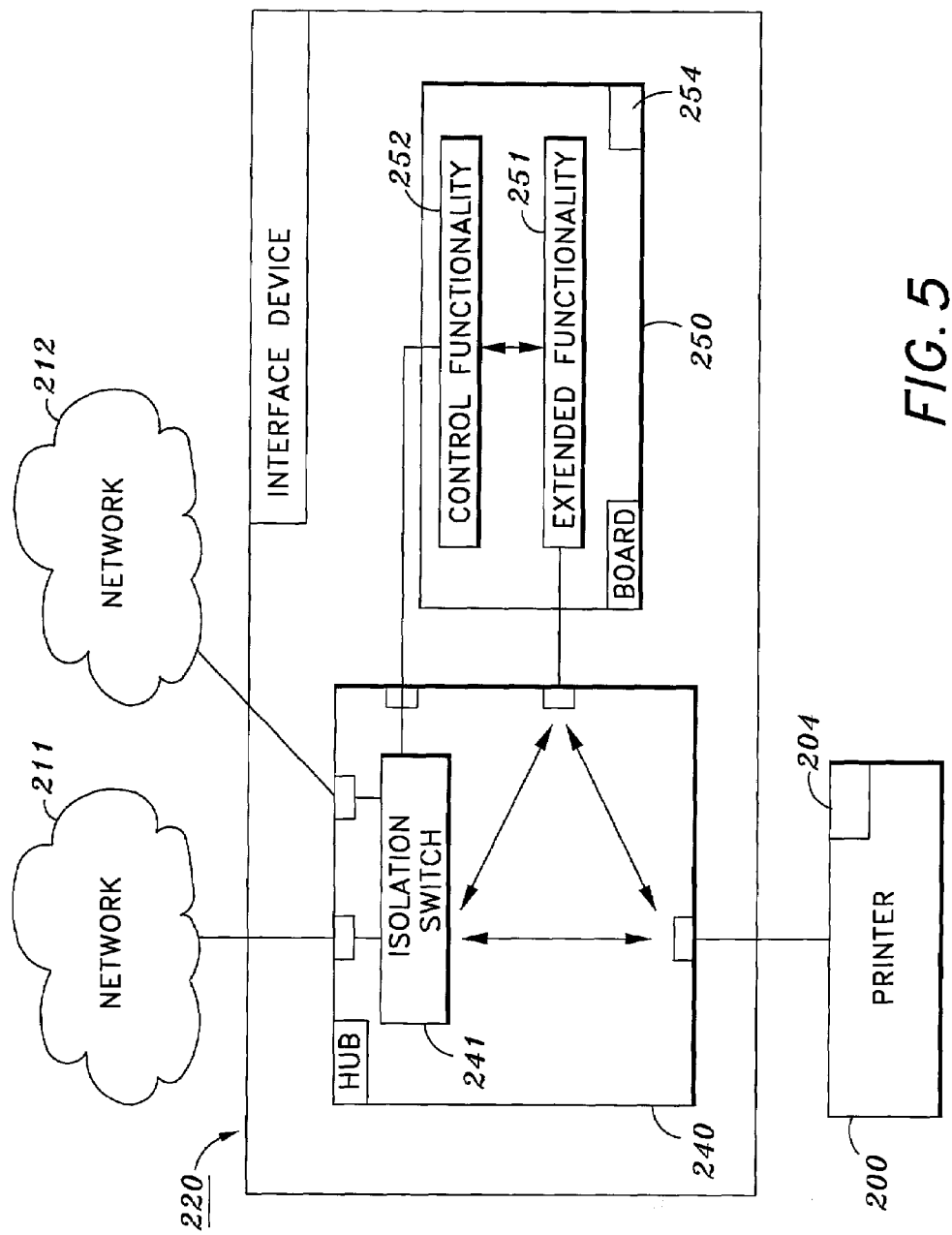
FIGS. 5 and 6 are views for explaining alternate embodiments, respectively.
Figure 6:
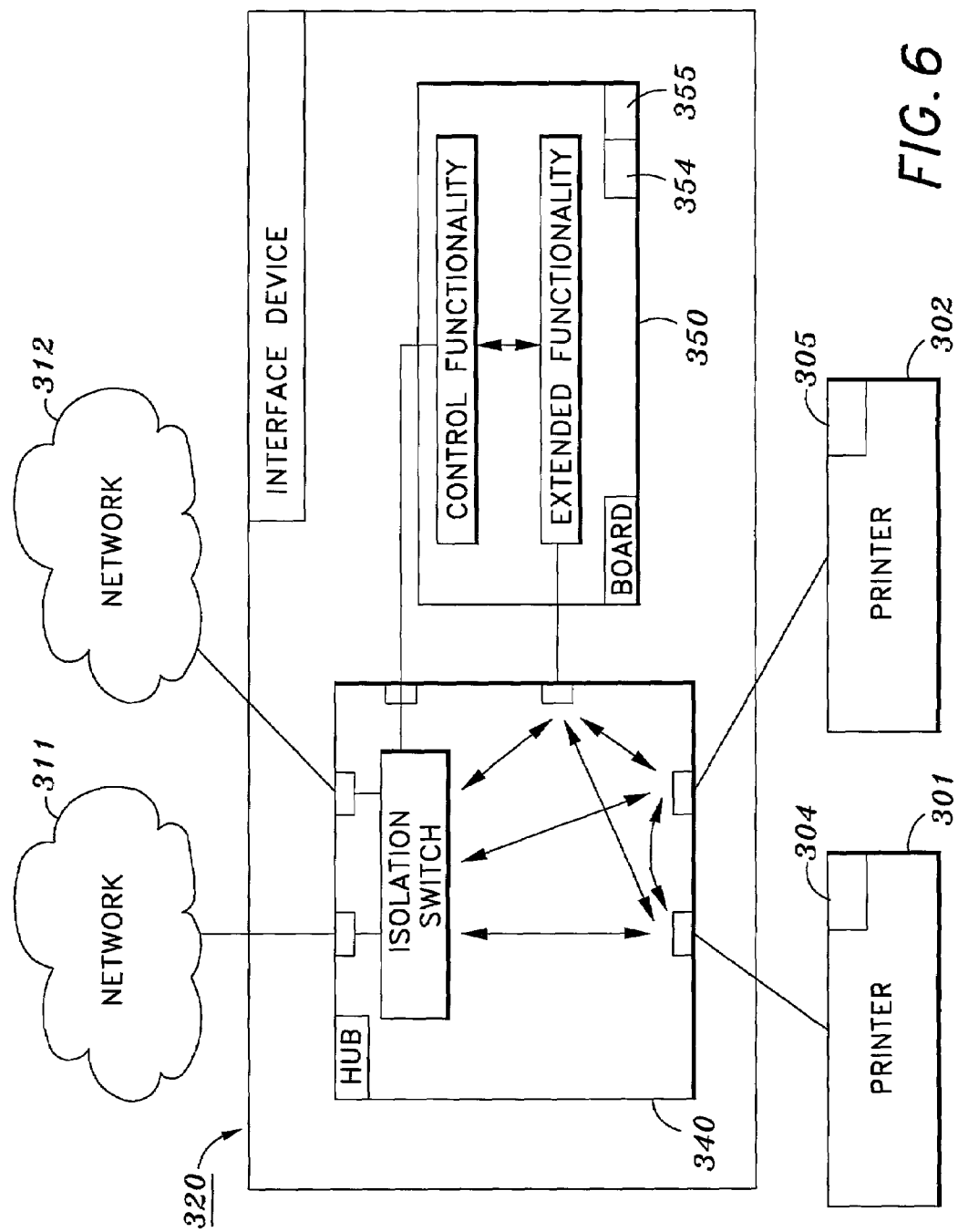

FIGS. 5 and 6 are views illustrating second and third embodiments, respectively. One difference in the embodiment depicted in FIG. 5 from that of FIG. 3 is that the embodiment of FIG. 5 permits access to the networkable device (here, printer 200) from multiple different networks 211 and 212. Consequently, hub 240 includes multiple ports connected to networks, and isolation switch 241 operates to isolate all such ports in response to a common control signal received from control functionality 252.

One difference between the third embodiment shown in FIG. 6 and that shown in FIG. 5 is the provision of multiple different networkable devices (here, printers 301 and 302). In this embodiment, circuit board 350 listens at addresses 354 and 355 for network traffic addressed to any one of the connected printers and responds as described hereinabove to isolate networks 311 and 312 in the event that network traffic on a secure port is addressed to any one of addresses 304 and 305 of printers 301 or 302.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for isolating a network from a networkable device using an interface device having a hub and a circuit board, said hub having plural ports and constructed to repeat network transmissions received on one port to others of the plural ports, said plural ports including a first port connected to the network, a second port connected to the networkable device, and a third port connected to the circuit board, said hub further including an isolation switch controllably operable to isolate the first port from network transmissions repeated by the hub, said method comprising:

maintaining the isolation switch in a pass-through mode in which network transmissions are repeated to the first port;

receiving a job addressed to the networkable device but on a port number to which the networkable device does not respond;

implementing network functionality on the circuit board to respond to the job addressed to the networkable device;

a first setting step of setting the isolation switch to a bypass mode in which the hub does not repeat network transmissions to the first port;

transmitting data from the circuit board addressed to the networkable device and on a port number to which the networkable device listens, after setting the isolation switch to the bypass mode; and a second setting step of setting the isolation switch to the pass-through mode after the network transmission to the networkable device is complete.

2. A method according to claim 1, wherein the networkable device is a printer, and wherein network functionality of the circuit board provides extended functionality for the printer.

3. A method according to claim 2, wherein in said first setting step, the isolation switch is set to the bypass mode based on the extended functionality.

4. A method according to claim 2, wherein the extended functionality implements secure printing.

5. A method according to claim 1, wherein said networkable device listens for network transmissions on a specific port number.

6. A method according to claim 5, wherein in said first setting step, the isolation switch is set to the bypass mode in response to network transmissions on the specific port number.

* * * * *